United States Patent [19]

Liu

[11] Patent Number: 5,143,399
[45] Date of Patent: Sep. 1, 1992

[54] GOLF CART

[76] Inventor: John Son Liu, P.O. Box 82-144, Taipei, Taiwan

[21] Appl. No.: 704,376

[22] Filed: May 23, 1991

[51] Int. Cl.⁵ .............................................. B62B 1/12
[52] U.S. Cl. .................................. 280/646; 280/652; 280/655; 280/DIG. 6
[58] Field of Search ................ 280/DIG. 6, 646, 652, 280/655, 655.1

[56] References Cited

U.S. PATENT DOCUMENTS 4,936,598  6/1990  Lee ............................... 280/DIG. 6
5,048,856  9/1991  Sanders et al. ............... 280/DIG. 6

FOREIGN PATENT DOCUMENTS 3423458  6/1985  Fed. Rep. of Germany ... 280/DIG. 6

Primary Examiner—Eric D. Culbreth
Attorney, Agent, or Firm—Alfred Lei

[57] ABSTRACT

This invention relates to a golf cart and in particular to one which includes an upper rod with a handle grip, a pivot joint having an upper member, a lower member and a U-shaped member, a seat fixedly locked on the bottom of the upper member, an axle member having pivot seat, and a supporting seat fixedly mounted on the lower end of the lower rod, whereby the handle grip can be adjusted in height as desired and the golf cart may be easily assembled and provide a sturdy construction.

1 Claim, 8 Drawing Sheets

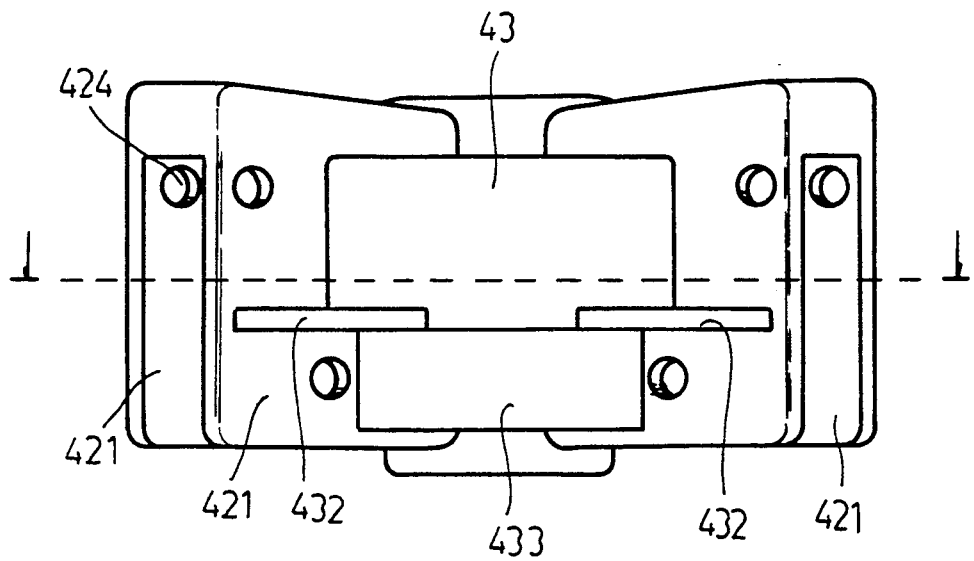
F I G. 7
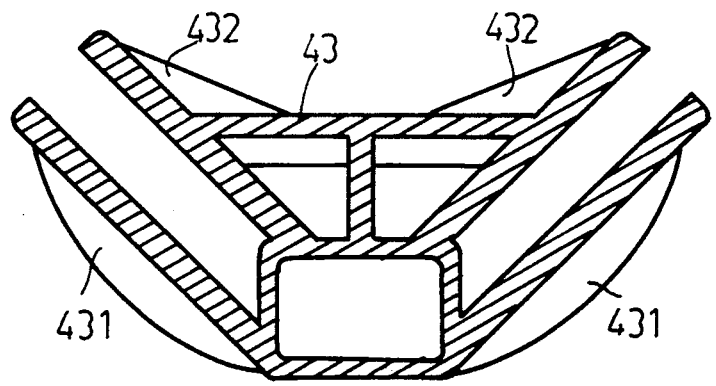
F I G. 8

GOLF CART

BACKGROUND OF THE INVENTION

It is found that the prior art golf cart is unsatisfactory and has the following drawbacks:

1. The height of the handle grip is fixed and cannot be adjusted.
2. It is high in cost.
3. It has a short service life.
4. It is difficult to assemble.
5. It is complicated in structure. Therefore, it is an object of the present invention to provide an improved golf cart which may obviate and mitigate the above-mentioned drawbacks.

SUMMARY OF THE INVENTION

This invention relates to an improved golf cart.

It is the primary object of the present invention to provide a golf cart with a handle grip which may be adjusted in height as desired so as to adapt the different users.

It is another object of the present invention to provide a golf cart which is sturdy in construction.

It is still another object of the present invention to provide a golf cart which is easy to assemble.

It is still another object of the present invention to provide a golf cart which is low in cost.

It is a further object of the present invention to provide a golf cart which is economic to produce.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIG. 7 is a rear side view of the rectangular tubular member;

FIG. 8 is sectional view of the rectangular tubular member;

DESCRIPTION OF THE PREFERRED EMBODIMENT

Figure 1:
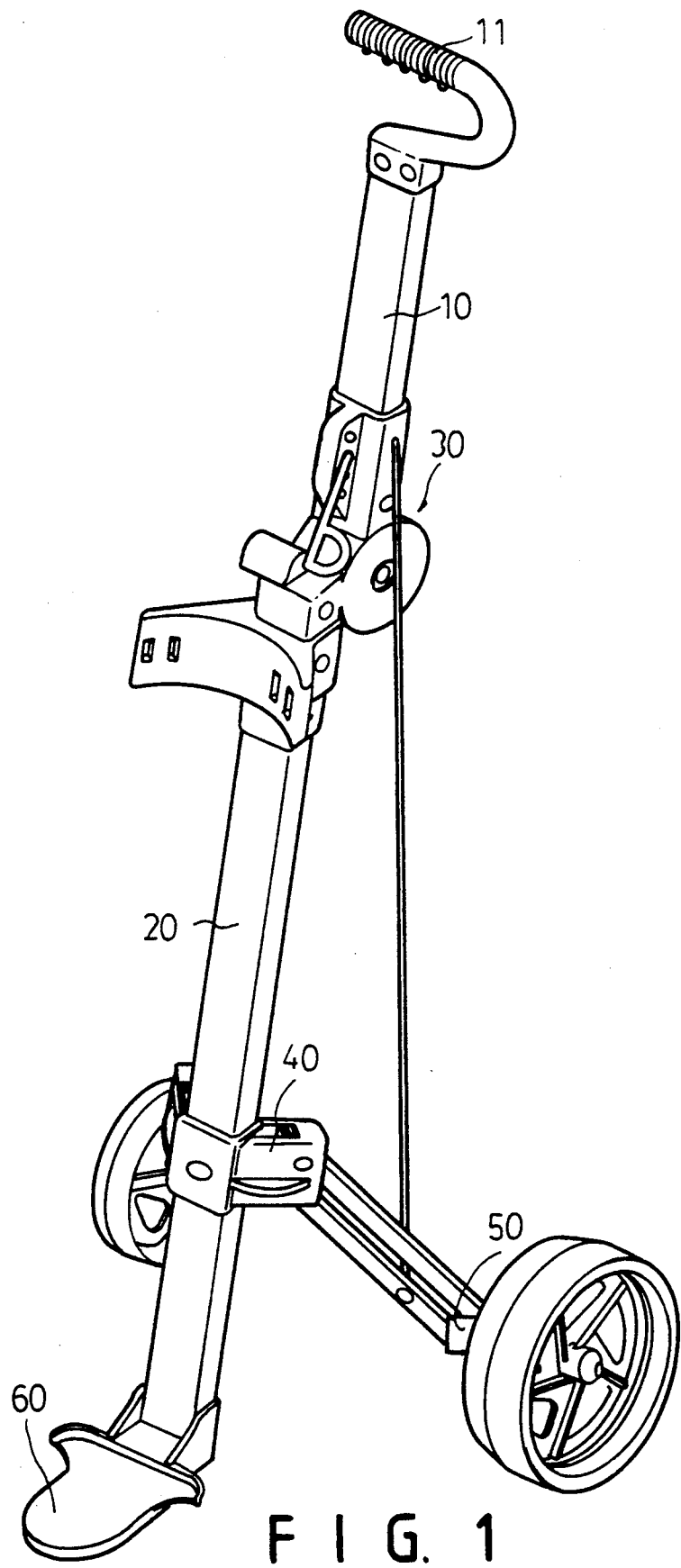
FIG. 1 is a perspective of a golf cart according to the present invention.
Figure 2:
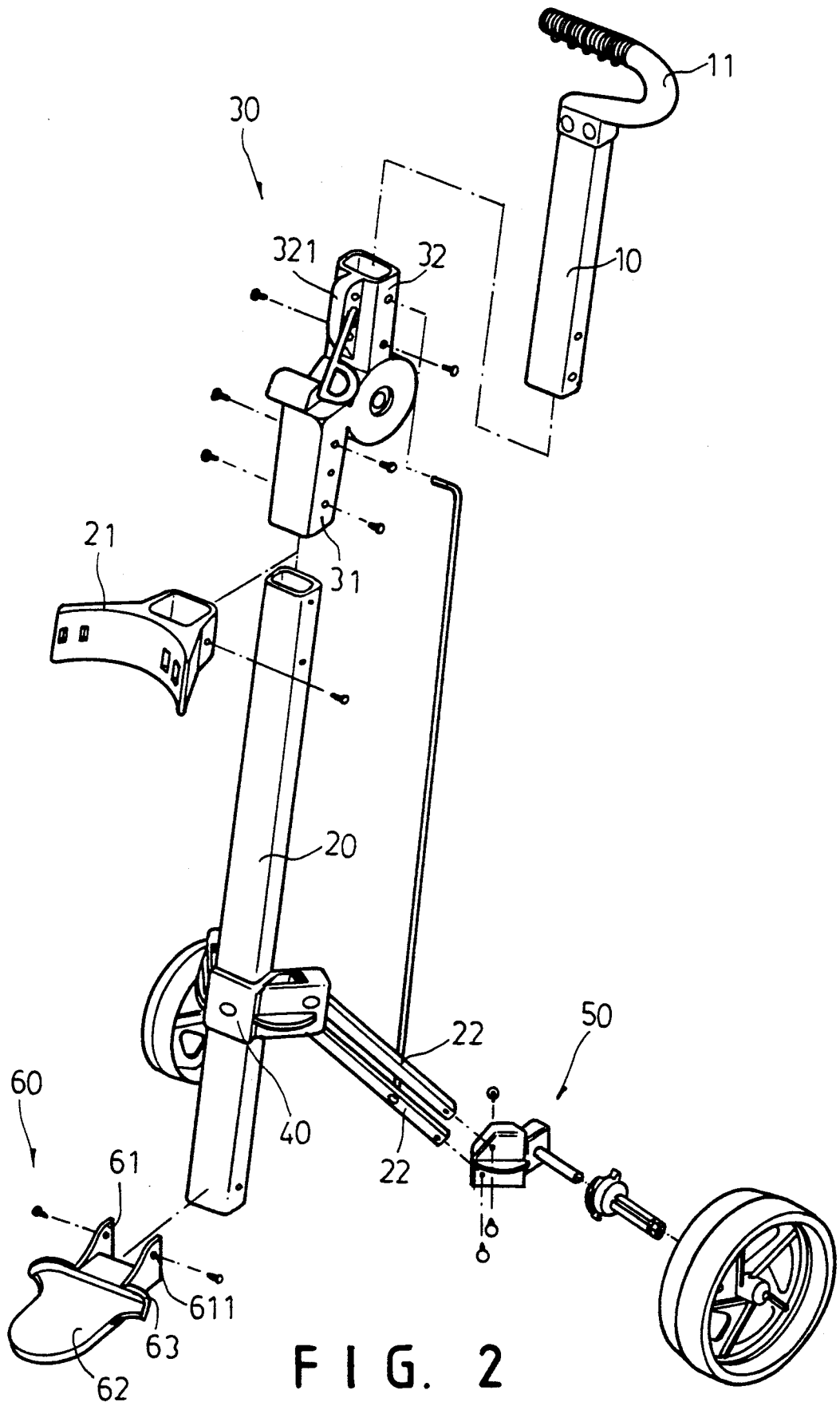
FIG. 2 is an exploded view of the golf cart.
Figure 3:
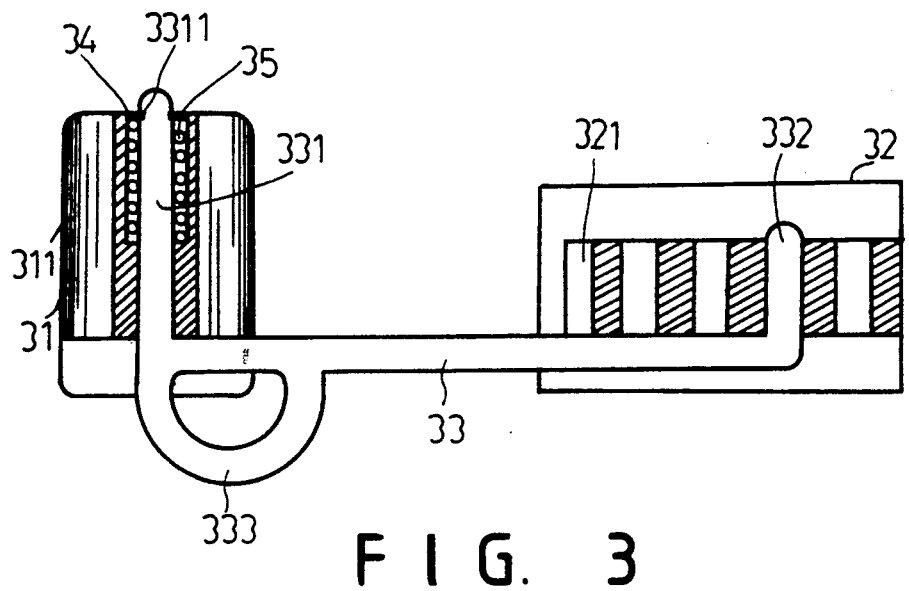
FIG. 3 is a fragmentary cutaway view of FIG. 1, showing the engagement between the U-shaped rod and the upper member and the lower member.
Figure 4:
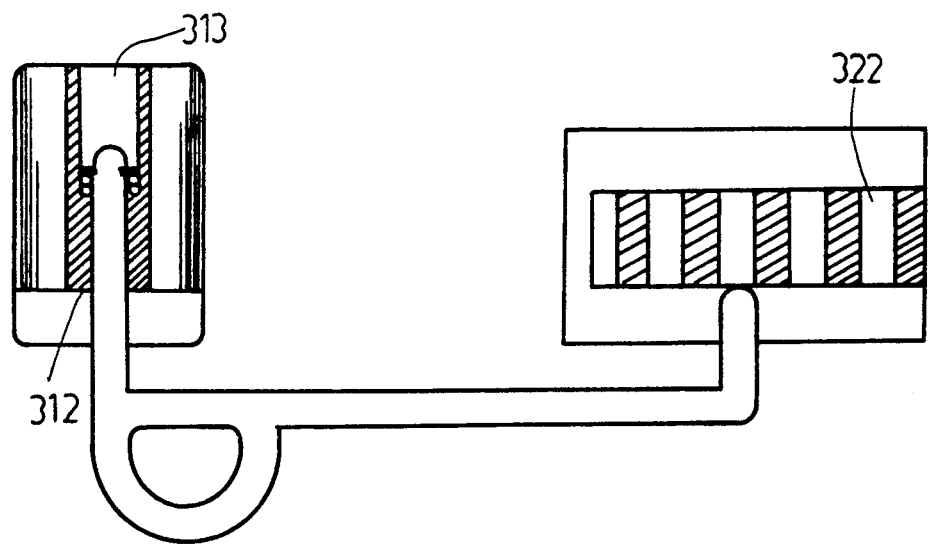
FIG. 4 is a fragmentary cutaway view of FIG. 1, showing the way to adjust the height of the handle grip.
Figure 5:
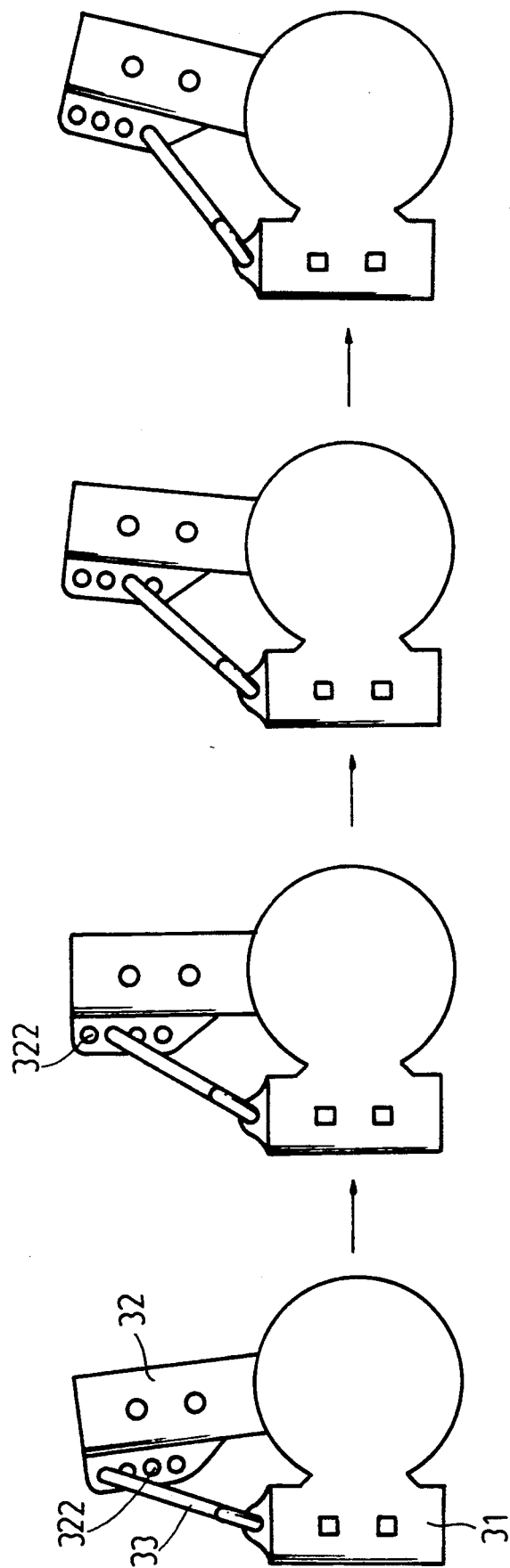
FIG. 5 shows the working principle of the pivot joint.

With reference to the drawings and in particular to FIG. 1 thereof, the golf cart according to the present invention mainly comprises an upper rod 10 with a handle grip 11 and a lower rod 20 which are locked into a pivot joint 30. The pivot joint 30 is composed of a lower member 31, an upper member 32 and a U-shaped rod 33 (see FIGS. 3 and 4). The lower member 31 is provided with an engaging portion 311 in which there is a through hole 312 and a chamber 313 with a diameter slightly larger that of the hole 312, while the upper member 32 has a flanged wall 321 with a plurality of holes 322. The U-shaped rod 33 includes a long end 331, a short end 332 and a loop 333 for the passage of a finger between the long end 3311 and the short end 332. At the tip of the long end 311 of the U-shaped rod 33 there is a groove 331 for engaging with a C-ring 34 so as to keep a compressed spring 35 in the chamber 313 of the lower member 31. When desired to adjust the height of the handle grip 11, it is only necessary to pull up the loop 333 as far as possible from lower member 31 so as to said the short end 332 out of the hole 322. Then, the handle grip 11 is adjusted to an appropriate position, the loop 333 is released thereby causing the compressed spring 35 to recover, and the short end 332 is inserted into another hole 322, whereby the handle grip 11 is adjusted to a desired position. When desired to collapse the golf cart for stowage, it is only necessary to pull up the loop 333 and turn the upper member 32 through an angle of 180 degrees so as to collapse the upper rod 10, the handle grip 11 and the lower rod 20 together.

Figure 6:
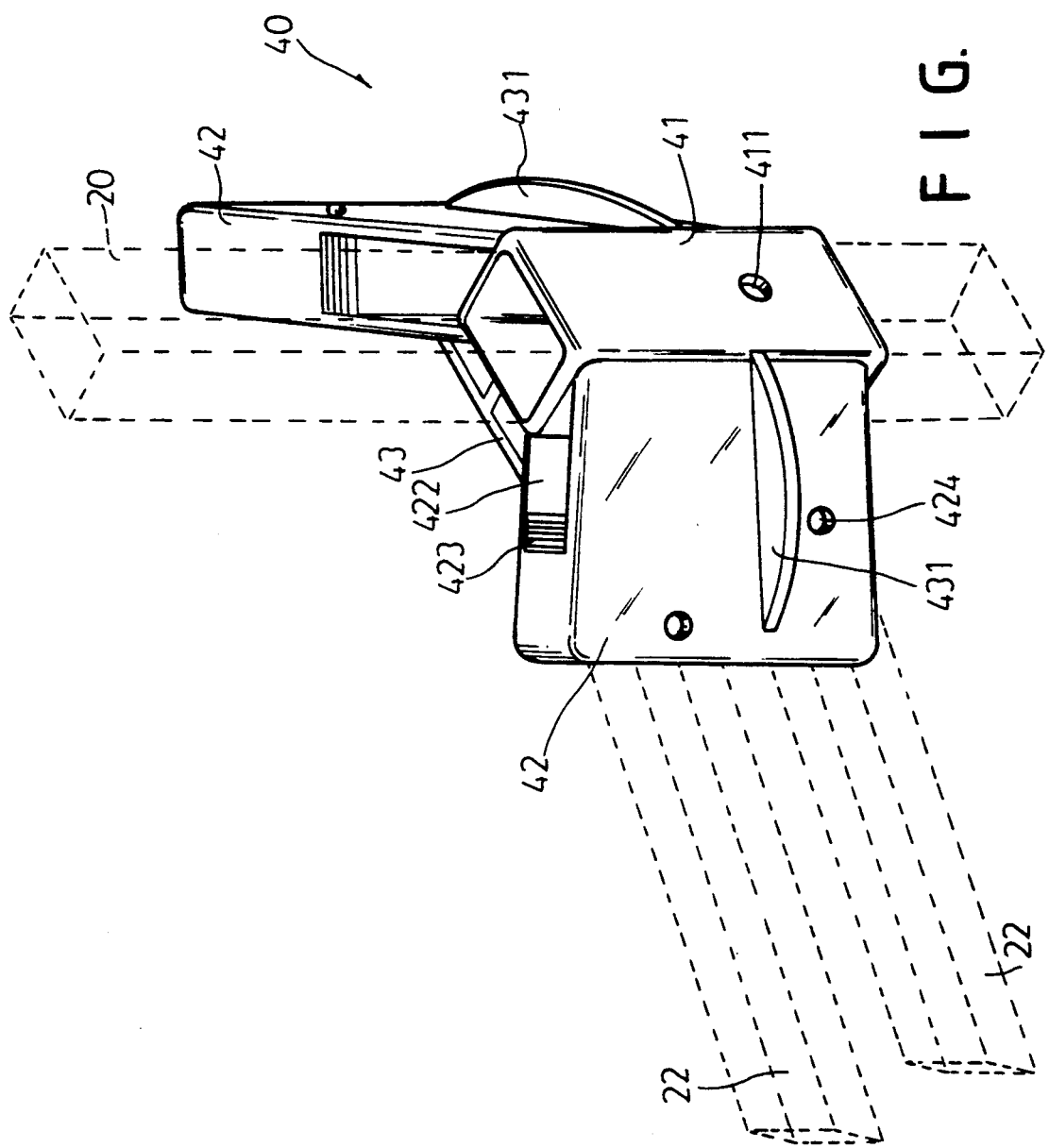
FIG. 6 is a perspective view of the rectangular tubular member.

A seat 21 is fixedly locked on the bottom of the lower member 31 for supporting the a golf bag. On the lower rod 20 there is a fixed member 40 pivotally connected with a lever 22 (see FIGS. 6, 7 and 8). The fixed member 40 comprises a rectangular tubular member 41 with a through hole 411 in the front and the rear and a wing member 42 at both sides. The wing member 42 makes an angle of 45 degrees with the tubular member 41 and is composed of two plates 421 on each of which there is a recess 422 and a plurality of transverse slots 423. In addition, the wing member 42 is formed with two through holes 424 for connecting the lever 22. A T-shaped rib 43 is provided between the two wing members 42 for strengthening the structure thereof. In addition, a reinforcing rib 431 is provided on the outer side of the wing members 42 and a rectangular rib 433 is joined with the T-shaped rib 43.

Figure 9:
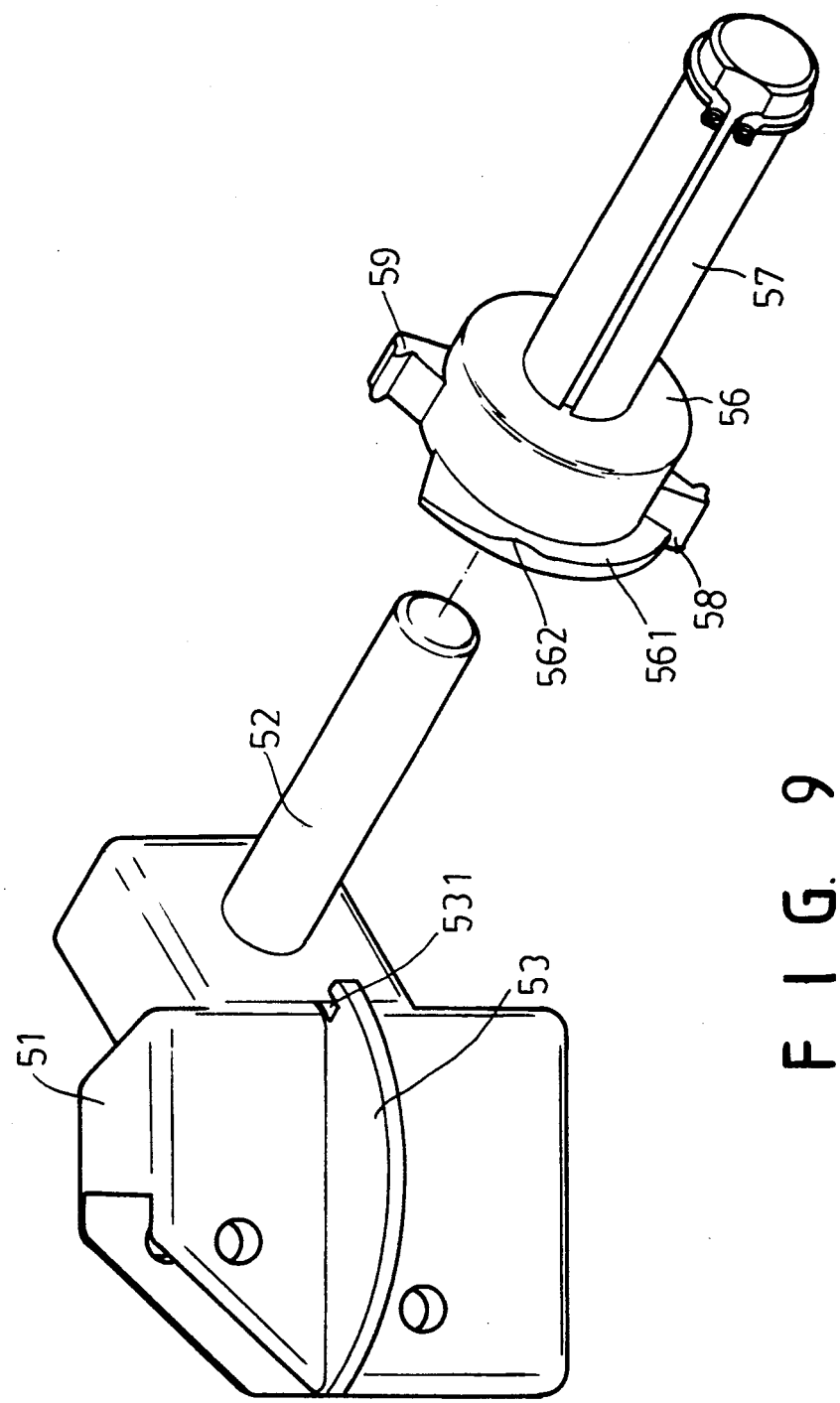
FIG. 9 is an exploded view of the axle member.
Figure 10:
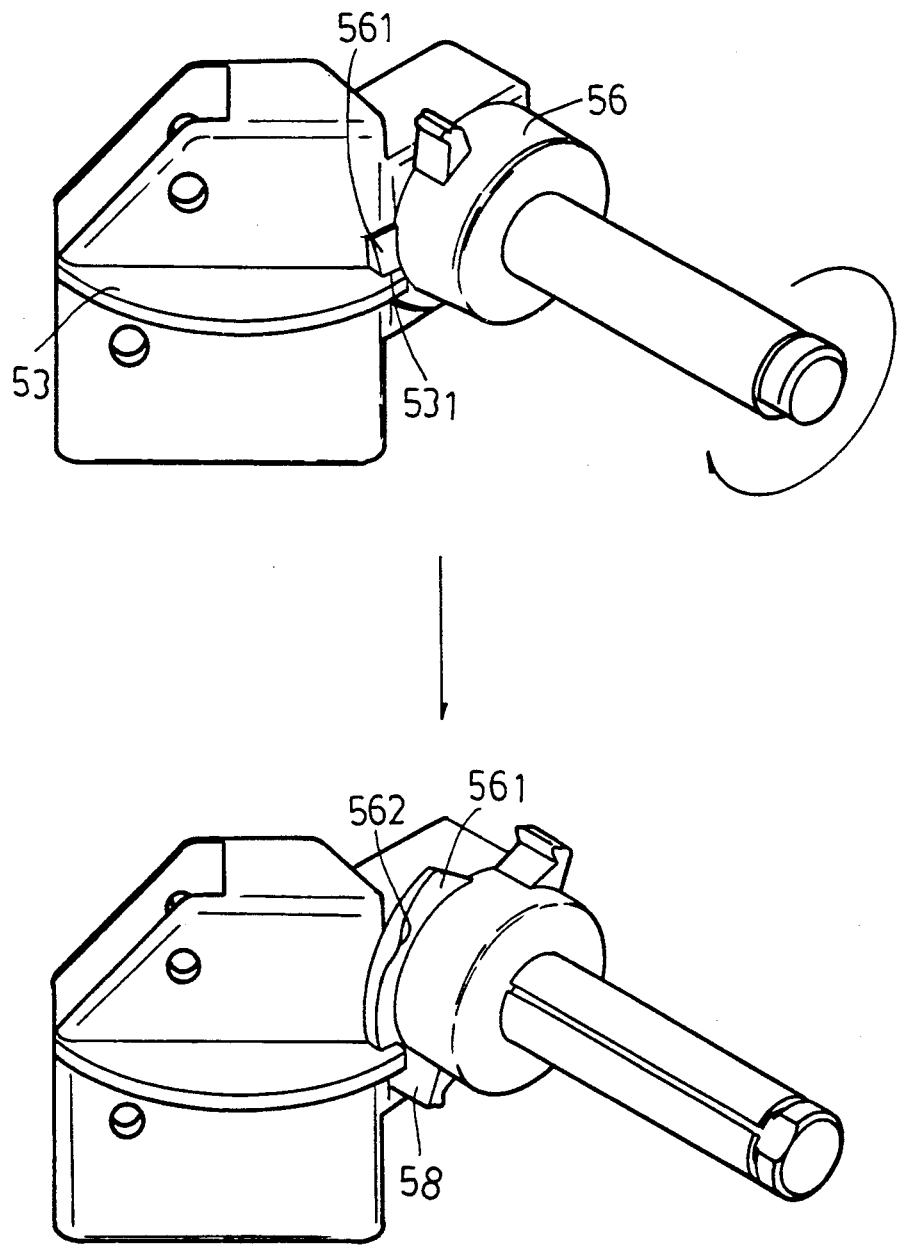
FIG. 10 shows the working principle of the axle member.

The lever 22 is connected to a wheel via an axle member 50 (see FIGS. 9 and 10) and has a pivot seat 51 on which there is a shaft 52, a reinforcing plate 53, a plurality of reinforcing ribs and a cylindrical portion 56. The reinforcing plate 55 has a notch 531 while the cylindrical portion 56 is provided with a sleeve 57. Further, the cylindrical portion 56 has two protuberances 58 and 59 and a curved rib 561 with a flange 562. As the width of the flange 562 is slightly larger than the depth of the notch 531, the flange 562 may be forced fitted into the notch 531. When the sleeve 57 is engaged with the shaft 52, the clearance between the pivot seat 51 and the wheel just enable the passage of a user's finger to rotate the wings 58 and 59 and the notch 531 is engaged with the curved rib 561.

A supporting seat 60 which is integrally made is fixedly mounted on the lower end of the lower rod 20 and has two webs 61 with a threaded hole 611 for engaging with the lower rod 20. The supporting seat 60 further has a horseshoe receiving plate 62 and a curved stop 63 between the web 61 and the receiving plate 62 for supporting the golf bag.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A golf cart comprising:

an upper rod with a handle grip;

a pivot joint including an upper member, a lower member and a U-shaped rod, said lower member being provided with an engaging portion in which there is a through hole and a chamber with a diameter slightly larger than the hole, said upper member having a flanged wall with a plurality of holes, said U-shaped rod having a long end, a short end and a loop for passage of a finger between said long end and said short end, said long end having a groove for engaging with a C-ring so as to keep a compressed spring in the chamber of said lower member;

a lower rod locked into said pivot joint;

a fixed member being a rectangular tubular member and fixedly locked on bottom of said lower rod, said fixed member having at both sides a wing member which makes an angle of 45 degrees with the fixed member and is composed of two plates on each of which there is a recess and a plurality of transverse slots, said wing members being formed with two through holes for connecting a lever, a T-shaped rib between said wings, a reinforcing rib on an outer side of said wings and a rectangular rib joining distal ends of T-shaped rib;

an axle member connected to said lever and having a pivot seat on which there is a shaft, a reinforcing plate, and a cylindrical portion, wherein said reinforcing plate has a notch and said cylindrical portion is provided with a sleeve, two protuberances and a curved rib with a flange; and a supporting seat fixedly mounted on a lower end of the lower rod and having two webs with a threaded hole for engaging the lower rod, a horseshoe receiving plate and a curved stop between the web and the receiving plate.

* * * * *